Patented Apr. 18, 1939

2,154,482

UNITED STATES PATENT OFFICE 2,154,482

CHEWING GUM BASE

Harry M. Weber, West Englewood, N. J., assignor, by mesne assignments, to Prolamine Products Incorporated, Dover, Del., a corporation of Delaware No Drawing. Application January 30, 1937, Serial No. 123,231

8 Claims. (Cl. 99—135)

The present invention relates to chewing gum bases comprising prolamine as a protein constituent, and in particular to economical and practical process for incorporating the prolamine of commerce into such mixtures.

Heretofore it has been proposed to combine prolamine resin and rubber to make a chewing gum base having satisfactory characteristics. Difficulty is experienced in incorporating prolamine into the plastic mass of other components. for example, Hatherell U. S. Patent No. 1,887,930, describes in detail a process for making a gum base from cumarone resin, rubber and gliadin, which is the prolamine from wheat. He gives in detail the method of extracting the prolamine from the grain with an equal weight of 70% grain alcohol (30% water). The liquid extract is distilled to remove alcohol. This results in a gummy mass of gliadin and residual water from the dilute alcohol. This gummy or doughy residue, the rubber and the resin are mixed, and then the residual water is dried out.

Difficulty has been experienced in masticating the ingredients to incorporate the prolamine dough into the mass to a homogeneous condition. Much power and hence expense is required and this defeats the purpose of preparing a cheap gum base. The dough of prolamine is not readily miscible with the other ingredients and must be dispersed therein by repeated subdivision through stretching and division by mixing. This procedure is impractical also because prolamine is ordinarily not prepared at the place where chewing gum bases are made, and it must be transported. Transportation of such prolamine dough is not practical for many reasons. Commercial dry powdered zein is believed now to be the only commercial prolamine available, and its transportation is practical.

Experiments to make a suitable gum base from dry powdered zein have failed, when adding the dry powder to a mastic mixture. The particles as fine as 100 mesh zein lump together and even if they are dispersed they are not readily subdivided to uniform incorporation in the base. Even long time mastication to wear down the particles is ineffective, since the particles are too tough to be torn apart by the adhesive pull of the mastic matrix in the mixing process. Gum made from such base exhibits the grittiness of the particles.

The present invention provides for simple, efficient and cheap methods of handling commercial prolamine to incorporate it in a chewing gum base to produce a successful gum.

The object of the invention is to subject the dry tough powdered prolamine to a dispersion process prior to incorporating it into a mastic mixture.

There are several ways in which this may be done and all are effective to destroy that toughness of the particle which makes it resistant to proper dispersion in a mixer with mastic material. Dispersion is used in its broad sense and several types of dispersion are here contemplated. One form is dispersion to a liquid solution or colloid, by use of a suitable solubilizing agent. Another is dispersion to a colloidal jell form, as by treating with a swelling agent. Still another type of dispersion is by treatment with an agent which dissolves it, and which agent is a component of the gum base.

It is known that the prolamines are subject to slight swelling with warm water, for example, at about 140° F. to a form which is considered as a gel form. The swollen product is soft and tender, compared with the dry tough particle. The dry powdered zein or other prolamine which is to be used is first suspended in water which is preferably warm. The particles swell and become tender. The excess of water is drained away and the swollen tender particles are incorporated into the mastic material. They now have less tensile strength than the mastic substance and hence are quickly and easily pulled apart to smaller and smaller particles as the mixer is operated, until they become so minute as to be homogeneously distributed.

Still another way is to make a solution of the zein or other prolamine in alkali, and incorporate into this solution one or more of the other ingredients of the gum base to form an emulsion. For example, jelutong may be so emulsified. Then upon suitably neutralizing or acidifying this emulsion the jelutong and the prolamine coagulate together with the prolamine finely dispersed in the jelutong.

Another method is to incorporate the alkali solution into a mastic mass until it is well dispersed therein, then to masticate the mass further in an acid bath, such as dilute acetic or lactic acid. As the dissolved alkali-prolamine comes in contact with the acid it is precipitated in desired form in the mass. Water may be used later to assure that acid and salt from neutralization are washed out.

Still another way of incorporating the prolamine involves dissolving or dispersing it into one or more of the gum base constituents. It is necessary to select one or more ingredients by a suitable test. It may be possible so to dissolve prolamine for one type of gum base but not for another. For example, zein dissolves in melted cumarone resin. A zein-cumarone gum base would then be made by first dissolving the zein in the melted resin, and then using this mass for incorporation of the other ingredients, whether or not the resin solution of prolamine is melted, or merely soft and plastic.

Prolamine may be dissolved in a water-alcohol solvent therefor, and this may be diluted with water to produce a granular product. In this process it has been discovered that the prolamine may also be precipitated as a doughy or gummy mass, and that by control of the pH value of the solution the prolamine can be obtained in granular form. This is described for zein in the Buron and McDonough Patent No. 2,044,769 of June 23, 1936. This granular prolamine is of course still wet and such particles may be readily dispersed in the mixer for chewing gum bases.

A gum base using zein may be considered as presenting somewhat different problems than one using gliadin. Gliadin as prepared by extraction of wheat is purer than zein directly extracted from corn or corn gluten by a similar process. The zein extract contains oils, fatty acids and coloring matter which would make a gum impossible of use because of taste and odor. Therefore, zein must be purified, whereas gliadin need not be. Present day purification processes yield the dry powdered zein when conducted to provide zein of commerce. Hence where zein is to be used, its dry form presents a problem not met with heretofore.

It is known that the incorporation of prolamine in a gum base lessens the tackiness of the gum. But in so doing there is a tendency to toughen the chew of the gum. This toughening is readily compensated for by adding plasticizing ingredients. To do this it is merely necessary to adjust the propo... n of any oil, fat or wax which may be and ordi... y is a component of a chewing gum base.

The invention may be practiced with any type of gum base, whether it be a chicle base, the resin-rubber base as in Hatherell, or the chicle-resin base of the applicant's prior Patent No. 1,402,817. The compositions may be for ordinary chewing gum or for special purpose gums, such as bubble gum. Absence of tackiness in bubble gum is particularly desirable.

The invention contemplates that the prolamine be wet with some liquid, yet that it be in dispersed form. Not only the kind, but the quantity of wetting liquid is important, for a small quantity may agglomerate the particles, while a large quantity will disperse them. For example, any solvent mixture of alcohol and water will disperse a limited quantity of prolamine. A smaller quantity of said solvent may act upon the above quantity of prolamine to wet it, yet to gum it into a mass or wad, comparable to the above mentioned dough to be avoided. A limited quantity of warm water at about 140° F. may sufficiently swell prolamine so that the particles will agglomerate into a dough, while a larger body of water will maintain a dispersion. A solution of caustic soda may likewise be used in limited quantity to gum up a zein powder, while a larger quantity will dissolve all of it to a colloidal dispersion. The melted cumarone resin in small quantity will gum the prolamine, while a larger quantity of the resin will dissolve and disperse it. The dispersed particles may be visible to the eye as in precipitated condition, or they may be invisible to the eye as in solution in caustic soda or a cumarone resin. The melted cumarone resin is considered as a liquid which wets prolamine, as is also cautic soda, alcohol-water prolamine solvents, and even water. It is only essential that a dispersing quantity of such liquid be used.

The process of dispersing by the use of water alone involves conversion of a hard solid particle of high tensile strength into a distended particle, having a gel form in which colloidal particles appear in a dispersed soft gel form. In other words, the solid dry particle becomes an aggregate of smaller particles.

In order to illustrate the invention and also the ordinary and special types of gum the following example is given.

*Example I*

The following ingredients are used in the order named:

| | Parts by weight |
|---|---|
| Cumarone resin (M. P. 130°–140° C.) | 256 |
| Zein | 225 |
| Candelilla wax (M. P. 67° C.) | 35 |
| Hydrogenated peanut oil | 35 |
| Refined beeswax | 10 |
| Mineral filler, such as calcium or magnesium carbonate | 200 |
| Washed gum pontianak containing: {water 40%, rubber 6% to 10%, resin 50% to 54%} | 383 |
| Rubber latex (40% rubber) | 177 |
| Liquid petrolatum (any edible heavy mineral oil) | 45 |
| Rubber | 102 |
| Resin | 456 |
| Zein | 225 |
| Oil fat or wax | 125 |
| Mineral filler | 200 |
| Water | 259 |

To any cumaron resin melting above 100° C., and suitable in taste and odor for a gum base, is added the zein. Any suitable heated mechanical mixer may be used so that the resin is maintained above its melting point. The zein dissolves at 105°–120° C. Into this the ingredients named above are mixed.

During this process of mixing the temperature may be regulated by having from 65 to 70 pounds of steam pressure to heat the jacket of the mixer. Of course, constant addition of new ingredients cools the mass. The later ingredients include water, and the temperature at these additions is preferably just below 100° C., so that too much water is not lost from the composition. Considerable water vapor loss may be permitted. If the above "parts" are grams the time of mixing will be about 1¾ hours, and if in pounds, it will be about 4 to 4½ hours, variable of course with the relative size of charge and mixer. At the end of the process, the material should be sufficiently liquid in the mixer to flow out. It will have a temperature of about 120° to 125° C. It will set as it cools to a tough rubbery mass, which will fracture under a sharp blow. This is chewing gum base, and not chewing gum as marketed.

"*Bubble gum*".—The foregoing example makes a base for an ordinary chewing gum. It is capable of modification to make bubble gum. Bubble gum has special requirements. It must have exceptional ability to stretch to form bubbles, and must be tougher, rubbery, yet with a weak "return" power. The tackiness should be less than in ordinary gum. It should be appreciated that bubble gum is blown with the mouth until it bursts, when it flies in all directions and frequently some lodges on the face. The gum on the face should be readily removable, and hence greatly lacking in tackiness. Otherwise, it next smears the hands, and finally the clothing or the hair.

Gum made with a rubber-resin base may be made particularly useful as bubble gum. Prolamine renders the gum base tougher and less tacky, so that larger and less tacky bubbles may be blown. The gum of Example I offers too much resistance to blowing and is not a good bubble gum. By simple changes in the formula, a good bubble gum may be made. Increased plasticity is desired, and this can be obtained in one way by increasing the beeswax. The 10 parts in the formula may be increased to 30.

Bubble gum in accordance with the above formula is a distinctive type of gum, and is also a distinctive bubble gum in lacking tackiness, in having "bubble" properties, in having a clean soft chewy bite, and in having constant properties over a long chewing time, as required by youngsters.

Bubble or other gum for retail sale may be made from the above described rubber-resin base in any usual way. For example:

| | Parts by weight |
|---|---|
| Gum base | 330 |
| Corn syrup | 530 |
| Glycerin | 50 |
| Cane sugar | 1500 |
| Flavoring oil (peppermint) | 30 |

The gum base and syrup are mixed together using sufficient heat to soften the gum base to receive the syrup. Heat may or may not be required for mixing in the other ingredients. The final product is shaped and cooled.

Obviously the proportions of the materials used may be varied within wide limits, readily apparent from the foregoing description to those skilled in the art. Consequently the examples are to be considered as illustrative and not as limiting the scope of the invention in any way. For example, any product containing rubber, rubbery materials, such as para rubber, gutta siak, or the like may be used, when suitably clean for the purpose.

The plasticizing agent may be selected from various other waxes and oils, such as paraffin wax, japan wax, ceresin wax, and numerous natural or synthetic vegetable or mineral oils. Other resins than cumaron or pontianak may be used. In fact the ingredients of any suitable gum base lacking in prolamine as an essential element thereof may be used to include prolamine, when the addition of prolamine is properly compensated for by properly proportioning the plasticizing or anti-toughening agent.

I claim:

1. The method of making a chewing gum base to incorporate prolamine as a part thereof, which comprises dispersing solid prolamine into smaller particles by contact with a dispersing quantity of a liquid which wets prolamine, whereby agglomeration is prevented, and mixing the so dispersed prolamine with other ingredients for a chewing gum base until the prolamine is homogeneously distributed therein.

2. The method of making a chewing gum base to incorporate prolamine as a part thereof, which comprises treating prolamine with a dispersing quantity of an ingredient of a chewing gum base which ingredient has a liquid form that is a solvent for prolamine, and mixing the resulting mass with other ingredients of a chewing gum base until the prolamine is homogeneously distributed.

3. The method of making a chewing gum base to incorporate prolamine as a part thereof, which comprises treating dry solid prolamine particles with a sufficient quantity of warm water to soften and disperse the particles, and mixing the dispersed particles with other ingredients for a gum base until the prolamine is homogeneously distributed.

4. The method of making a chewing gum base to incorporate prolamine as a part thereof, which comprises treating solid prolamine with a dissolving quantity of alkali solution, dispersing into said solution an ingredient of a chewing gum base, precipitating the prolamine and said ingredient together by neutralizing the alkali, and mixing the precipitated mass with other ingredients of a chewing gum base.

5. The method of making a chewing gum base to incorporate prolamine as a part thereof, which comprises treating solid prolamine with a dissolving quantity of alkali solution, dispersing a rubber agent of a chewing gum base into said solution to make an emulsion, breaking the emulsion by neutralizing the alkali, whereby to precipitate said prolamine and said agent together, and mixing the resulting mass with other ingredients of a chewing gum base.

6. The method of making a chewing gum base to incorporate prolamine as a part thereof, which comprises treating solid prolamine with a dissolving quantity of alkali solution, dispersing jelutong into said solution to make an emulsion, breaking the emulsion by neutralizing the alkali, whereby to precipitate said prolamine and jelutong together, and mixing the resulting mass with other ingredients of a chewing gum base.

7. The method of making a chewing gum base to incorporate prolamine as a part thereof, which comprises treating said prolamine with a dissolving quantity of an aqueous liquid which dissolves prolamine, diluting the solvent with water to precipitate wet granular prolamine, and mixing the wet granular prolamine with other ingredients of a chewing gum base until the prolamine is homogeously distributed.

8. The method of making a chewing gum base to incorporate prolamine as a part thereof, which comprises dissolving the prolamine in melted cumarone resin, and mixing the resulting mass with other ingredients of a chewing gum base until the prolamine is homogeneously distributed.

HARRY M. WEBER.